No. 720,545. PATENTED FEB. 10, 1903.
M. VAN B. WISKER.
CHURN DASHER.
APPLICATION FILED MAY 24, 1902.
NO MODEL.
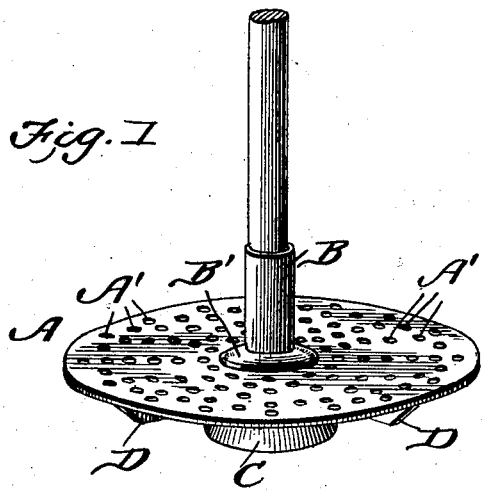
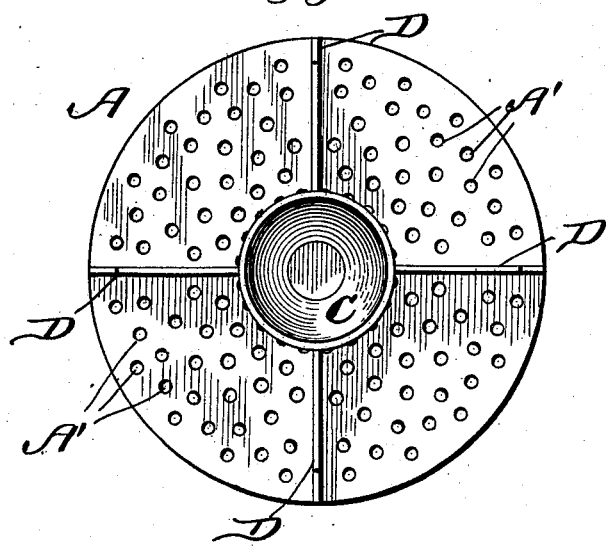
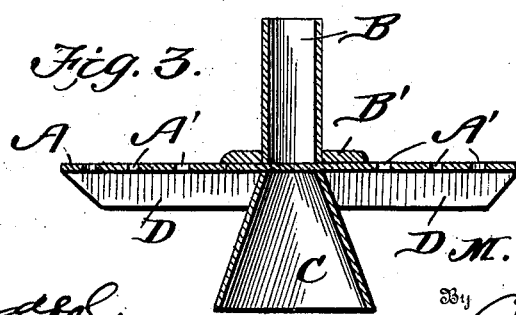
Witnesses
Inventor
D. M. Van B. Wisker.
Attorneys
THE NORRIS PETERS CO., PHOTO-LITHO., WASHINGTON, D. C.

UNITED STATES PATENT OFFICE.

MARTIN VAN BUREN WISKER, OF SEDALIA, MISSOURI.

CHURN-DASHER.

SPECIFICATION forming part of Letters Patent No. 720,545, dated February 10, 1903.

Application filed May 24, 1902. Serial No. 108,790. (No model.)

*To all whom it may concern:*

Be it known that I, MARTIN VAN BUREN WISKER, a citizen of the United States, residing at Sedalia, in the county of Pettis and State of Missouri, have invented a new and useful Improvement in Churn-Dashers, of which the following is a specification.

This invention is an improved construction of churn-dasher particularly useful in connection with reciprocating churns.

The object of the invention is to provide an exceedingly cheap, simple, and efficient construction of churn-dasher which in addition to the ordinary operation performed by the churn-dasher will serve to aerate the cream during the churning operation, and thereby serve to more quickly separate the butter-globules; and another object is to provide a churn-dasher capable of collecting the butter-globules into a compact mass.

With these various objects in view the invention consists, essentially, in providing a perforated disk with a depending cone and a series of radially-depending blades or wings.

The invention consists also in certain details of construction hereinafter fully explained, and pointed out in the claims.

In the drawings forming part of this specification, Figure 1 is a perspective view of a churn-dasher constructed in accordance with my invention. Fig. 2 is an inverted plan view. Fig. 3 is a vertical sectional view.

In constructing a dasher in accordance with my invention I employ a flat circular disk A, having a series of perforations A', and this disk may be constructed from any suitable material, either wood or metal. A handle-socket B is arranged centrally upon the upper side of the disk A and is reinforced at its lower end by means of a collar B', and depending centrally from the bottom side of the disk A is the truncated cone D, and radial wings or blades D are also arranged upon the under side of the disk, extending from the outer edge to the truncated cone, as most clearly shown in Figs. 2 and 3.

In operation the dasher is reciprocated in substantially the same manner as churn-dashers now in common use, and at each downward stroke of the churn-dasher a quantity of air is carried down through the cream by means of the truncated cone C, and upon the forward stroke this air disseminates through the cream, and thereby effects the aeration and also separation of the butter-globules. By giving the churn-dasher a slight rotary movement during the churning operations the depending blades or wings D serve to collect or assemble the butter into a compact mass.

Having thus fully described my invention, what I claim as new, and desire to secure by Letters Patent, is—

1. A churn-dasher comprising a disk having a laterally non-perforated cone depending centrally therefrom, and a plurality of radial blades or wings arranged upon the lower face of the said disk.

2. A churn-dasher comprising a perforated disk having a socket for the handle upon the upper side thereof, a truncated non-perforated cone dependent centrally upon the lower side thereof, and the depending wings or blades arranged radially as described.

3. A churn-dasher comprising a perforated disk having a handle upon the upper side thereof, a hollow laterally non-perforated truncated cone dependent from its lower side and wings arranged beneath the disk and radiating from said cone.

MARTIN VAN BUREN WISKER.

Witnesses:
 J. E. RITCHEY,
 WM. B. CHALLACOMBE.